United States Patent Office 3,663,568
Patented May 16, 1972

3,663,568
BENZO-TRIS-THIOPHENES
Ernst Roos and Klaus Wagner, Cologne, Germany, assignors to Farbenfabriken Bayer Aktiengesellschaft, Leverkusen, Germany
No Drawing. Filed Dec. 9, 1969, Ser. No. 883,635
Claims priority, application Germany, Jan. 16, 1969,
P 19 02 050.9
Int. Cl. C07d 63/22
U.S. Cl. 260—330.5
2 Claims

ABSTRACT OF THE DISCLOSURE

Novel benzothiophene derivatives are obtained by reacting an aromatic o-chloro-aldehyde in the presence of an acid binding agent with a mercaptomethyl compound.
The new compounds obtainable according to this process are useful as light protective agents for polyvinyl chloride.

This invention relates to novel benzo-(mono-, bis-, and tris-) thiophenes and to a process for the preparation thereof.

The present invention provides benzothiophenes of the formula

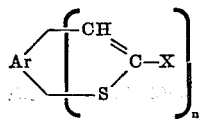

wherein Ar represents an optionally substituted benzene radical, X represents a carboxylic acid ester group or a cyano, carbonyl or sulphonyl group, and $n$ represents 2 or 3.

The present invention also provides a process for the preparation of these compounds which comprises reacting an aromatic o-chloro-aldehyde of the formula

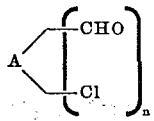

in the presence of an acid-binding agent, with a mercaptomethyl compound of the formula $$HS—CH_2—X$$

in which formulae, Ar represents an optionally substituted benzene radical, X represents an electrophilic radical, and $n$ represents 1, 2 or 3. The reaction is optionally carried out in an inert solvent.

Additional chlorine atoms and/or carbonyl, nitro, cyano, sulphonyl, lower alkyl and lower alkoxy groups are especially suitable substituents for the radical Ar. X is preferably a cyano, carbonyl or sulphonyl group and especially advantageously a carboxylic acid ester group in which the alcohol moiety is derived from an aliphatic alcohol (e.g. $C_{1-8}$, preferably $C_{1-4}$) which may optionally also contain a double or triple bond. The alcohol moiety may, of course, also be derived from a cycloaliphatic alcohol, especially benzyl and $\beta$-phenylethyl alcohol.

The following are suitable aromatic o-chloroaldehydes:

5-nitro-2-chloro-benzaldehyde;
3,5-dinitro-2-chloro-benzaldehyde;
2,3,5,6-tetrachloro-benzaldehyde;
pentachloro-benzaldehyde;
4-chloro-isophthalaldehyde;
4-methoxy-2,5,6-trichloro-isophthalaldehyde;
tetrachloro-isophthalaldehyde;
2,5-dichloro-terephthalaldehyde;
tetrachloro-terephthalaldehyde;
2-methoxy-4,6-dichloro-trimesitaldehyde;
trichloro-trimesitaldehyde; and
2,5-dichloro-3,6-bis-phenylsulphonyl-terephthalaldehyde.

The following are examples of suitable mercaptomethyl compounds for the process of the invention: Thioglycollic acid methyl, ethyl, n-propyl, i-propyl, n-butyl, secondary butyl or tertiary butyl esters; mercapto-acetaldehyde, mercapto-acetone, mercapto-acetonitrile, mercaptomethyl methyl sulphone and ω-mercapto-acetophenones, which may be substituted in the phenyl nucleus. The mercaptomethyl compound may similarly also be used in the form of a salt with the above mentioned basic compounds.

The acid binding agents may be tertiary amines such as triethylamine, dimethylbenzylamine and pyridine; alkali metal alcoholates; alkali metal hydroxides or alkali metal carbonates.

Reaction of the reactants is advantageously carried out in a polar or nonpolar solvent such as water, methanol, ethanol, isopropanol, acetone, dioxan, methyl glycol ether, dimethyl formamide, benzene, toluene or xylene. The reactants and the acid binding agent may be introduced into the reaction chamber in any desired sequence. The quantities of reactants are preferably in approximately stoichiometric proportions, which means also that, for example, 1 mol of trichlorotrimesitaldehyde may be reacted with 1, 2 or 3 mols of the mercaptomethyl compound II.

The reaction temperature is conveniently in the range from —20 to +180° C., preferably from 10 to 100° C.

The reaction mixture is worked up in the usual manner, e.g. by precipitation of the reaction product with water followed by recrystallisation.

The benzo- (mono-, bis- and tris-) thiophenes are new and represent valuable intermediate products and are intended to be used especially for the preparation of plant protection agents. They are distinguished by very high extinction values in the ultraviolet region of the spectrum. They are therefore also directly suitable for protecting synthetic resins and lacquers against the damaging influence of U.V. radiation.

The following Table A shows the position of the main band in the U.V. spectrum in terms of the reciprocal wavelength number $\bar{\nu}$ and the extinction maximum for $10^{-5}$ molar dioxan solutions of a few benzo- (mono-, bis- and tris-) thiophene-2-carboxylic acid ethyl esters.

TABLE A

| Structure | $\sqrt{-}$, cm.$^{-1}$ | Max. |
|---|---|---|
| 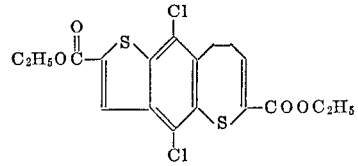 | 36,000 | 38,000 |
| 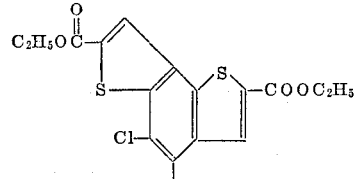 | 34,100 | 47,000 |
| 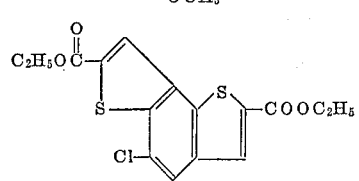 | 34,000 | 57,000 |
| 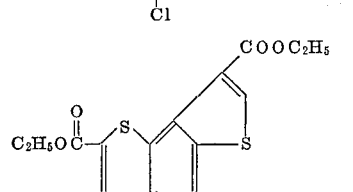 | 33,400 | 73,300 |

The efficiency of the new compounds as light protective agents for PVC is clear from the following experiments: Soft PVC plates, 30 mm. in thickness composed of 70 parts by weight of polyvinyl chloride and 30 parts by weight dioctyl phthalate were irradiated with a xenon test lamp and found to be completely permeable to shortwave UV light. After irradiation with a xenon test lamp (of Quarzlampengesellschaft, Hanau) brown discoloration occurred after 7 days, but when 1% by weight any of the substances indicated in the above Table A was added to the soft PVC, the shortwave UV radiation was completely absorbed. After irradiation with the xenon test lamp, yellow discoloration occurred only after 20 to 25 days.

The other compounds obtainable by the present process also show a comparable effect in PVC (polyvinyl chloride).

The following examples serve to illustrate the process of the invention more fully:

EXAMPLE 1

5-nitrobenzothiophene-2-carboxylic acid ethyl ester

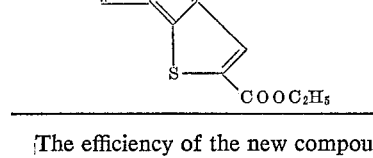

55.5 g. (0.3 mol) of 2-chloro-5-nitrobenzaldehyde and 36 g. (0.3 mol) of ethyl thioglycollate were dissolved in 200 ml. of ethanol and, after addition of 33.3 g. (0.33 mol) of triethylamine, the solution was boiled under reflux for 2 hours. The crystalline paste which was precipitated was removed by suction filtration, washed with water and methanol and dried.

Yield: 68 g. (90% of the theoretical) of almost colourless needles, M.P. 166° C.

EXAMPLE 2

3,6-dichloro-benzo-(1,2;4,5)-bis-thiophene-2'-carboxylic acid ethyl ester

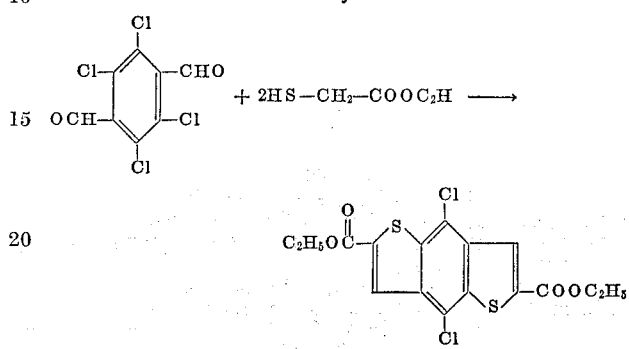

27.2 g. (0.1 mol) of tetrachloro-terephthalaldehyde and 20.2 g. (0.2 mol) of triethylamine in 250 ml. of ethanol were introduced into a reaction vessel, and 24 g. (0.2 mol) of ethyl thioglycollate was added with stirring, the reaction temperature rising from 25 to 33° C. A yellow suspension was formed which was boiled under reflux for 3 hours. When the mixture was cold, 500 ml. of water were added and the precipitate was removed by suction filtration and recrystallised from dimethyl formamide.

Yield: 32.4 g. (81% of the theoretical) of pale yellow crystals, M.P. 230–232° C.

$C_{16}H_{12}Cl_2O_4S_2$ (MW 403).—Calculated (percent): C, 47.64; H, 2.98; Cl, 17.62; O, 15.88; S, 15.88. Found (percent): C, 47.7; H, 3.0; Cl, 17.6; O, 15.9; S, 15.8.

EXAMPLE 3

Benzo-(1,2;3,4;5,6)-tris-thiophene-2'-carboxylic acid ethyl ester

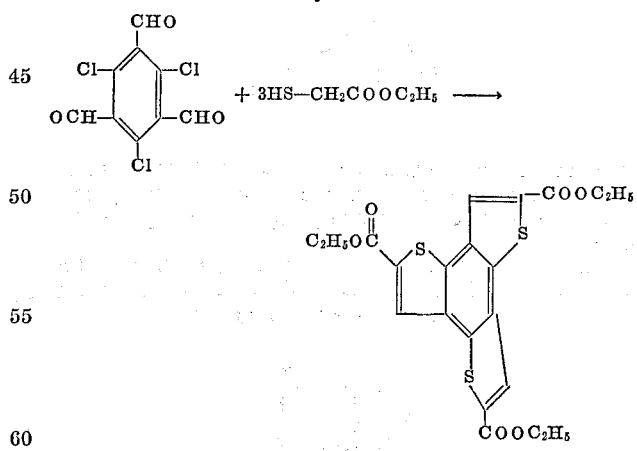

36 g. (0.3 mol) of ethyl thioglycollate were added to 26.55 g. (0.1 mol) of trichlorotrimesitaldehyde and 30.3 g. (0.3 mol) of triethylamine at 20 to 40° C., while the reaction mixture was cooled with ice. The resulting yellow suspension was boiled under reflux for 3 hours and, when it was cold, 500 ml. of water were added and the reaction product was filtered off with suction. It was recrystallised from dioxan.

Yield: 41 g. (89% of the theoretical), of yellowish crystals, M.P. 233–235° C.

$C_{21}H_{18}O_6S_3$ (MW 462). — Calculated (percent): C, 54.54; H, 3.90; O, 20.78; S, 20.78. Found (percent): C, 54.3; H, 4.2; O, 20.8; S, 20.7.

The compounds shown in Table I were obtained in an analogous manner.

TABLE I 3,4,5,6-tetrachloro-benzo thiophene-2'-carboxylic acid ethyl ester

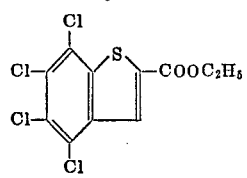

Colourless crystals; M.P. 136–137° C.
$C_{11}H_6Cl_4O_2S$ (MW 344).—Calculated (percent): C, 38.37; H, 1.74; Cl, 41.28; O, 9.30; S, 9.30. Found (percent): C, 38.4; H, 2.0; Cl, 40.9; O, 9.1; S, 8.5.

3-chloro-6-formyl-benzo-(1,2;5,4)-bis-thiophene-2'-carboxylic acid ethyl ester

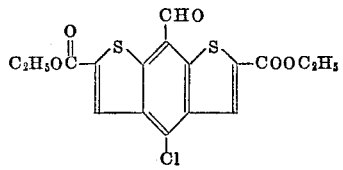

Almost colourless crystals; M.P. 190–192° C.
$C_{17}H_{13}ClO_5S_2$ (MW 396.5).— Calculated (percent): C, 51.45; H, 4.28; Cl, 8.95; O, 20.18; S, 16.14. Found (percent): C, 51.9; H, 3.6; Cl, 9.4; O, 20.1; S, 17.0.

3-methoxy-6-formyl-benzo-(1,2;5,4)-bis-thiophene-2'-carboxylic acid ethyl ester

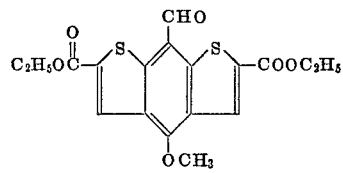

Almost colourless crystals; M.P. 172–174° C.
$C_{18}H_{16}O_6S_6$ (MW 392).—Calculated (percent): C, 55.10; H, 4.08; O, 24.49; S, 16.33. Found (percent): C, 54.9; H, 4.6; O, 25.0; S, 15.6.

3,4-dichloro-benzo-(1,2;5,6)-bis-thiophene-2'-carboxylic acid ethyl ester

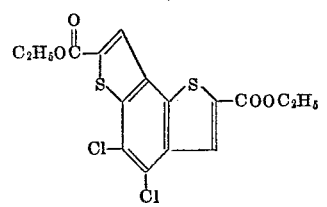

Colourless crystals, M.P. 215–217° C.
$C_{16}H_{12}Cl_2O_4S_2$ (MW 403).—Calculated (percent): C, 47.64; H, 2.98; Cl, 17.62; O, 15.88; S, 15.88. Found (percent): C, 47.6; H, 3.4; Cl, 17.7; O, 15.5; S, 15.8.

3-methoxy-4-chloro-benzo-(1,2;5,6)-bis-thiophene-2'-carboxylic acid ethyl ester

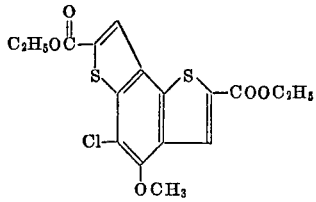

Almost colourless crystals, M.P. 160–161° C.
$C_{17}H_{15}ClO_5S_2$ (MW 398.5).—Calculated (percent): C, 51.19; H, 3.76; Cl, 8.91; O, 20.08; S, 16.06. Found (percent): C, 51.6; H, 4.3; Cl, 9.2; O, 19.8; S, 15.9.

Corresponding compounds which instead of containing the ethanol radical contain the radical of another aliphatic alcohol ($C_1$ or $C_{3-8}$) or the benzyl or phenethyl alcohol radical are obtained in analogous manner.

What we claim is:
1. A benzothiophene of the formula

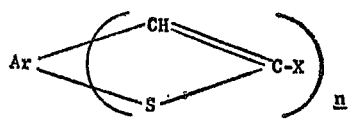

wherein
Ar represents a benzene radical;
X represents a member selected from the group of cyano, formyl, acetyl, benzoyl and methylsulphonyl group, and —COOR wherein R is alkyl, alkenyl, alkynyl and aryl, each with up to 8 carbon atoms, and $n$ is 3.

2. A compound according to claim 1 which is benzo-(1,2;3,4;5,6)-tris-thiophene-2'-carboxylic acid ethyl ester.

References Cited

Hartough et al.: Compounds With Condensed Thiophene Rings (Interscience, New York, 1954), p. 22.

HENRY R. JILES, Primary Examiner

C. M. SHURKO, Assistant Examiner

U.S. Cl. X.R.
252—405, 406